United States Patent
Ihs et al.

(10) Patent No.: US 9,496,787 B2
(45) Date of Patent: Nov. 15, 2016

(54) SWITCHED POWER STAGE AND A METHOD FOR CONTROLLING THE LATTER

(71) Applicant: Endura Technologies LLC, San Diego, CA (US)

(72) Inventors: Hassan Ihs, Vendargues (FR); Taner Dosluoglu, New York, NY (US)

(73) Assignee: Endura Technologies LLC, San Diego, CA (US)

( * ) Notice: Subject to any disclaimer, the term of this patent is extended or adjusted under 35 U.S.C. 154(b) by 29 days.

(21) Appl. No.: 14/593,830

(22) Filed: Jan. 9, 2015

(65) Prior Publication Data

US 2016/0049861 A1    Feb. 18, 2016

Related U.S. Application Data

(60) Provisional application No. 62/037,061, filed on Aug. 13, 2014.

(51) Int. Cl.
*H02M 3/156*    (2006.01)
*H02M 3/158*    (2006.01)

(52) U.S. Cl.
CPC ..... *H02M 3/158* (2013.01); *H02M 2003/1566* (2013.01)

(58) Field of Classification Search
CPC .... H02M 3/156; H02M 3/155; H02M 3/158; H02M 3/157; H02M 2001/0012
USPC ................. 323/222, 224, 282, 283, 284, 351
See application file for complete search history.

(56) References Cited

U.S. PATENT DOCUMENTS

| | | | | |
|---|---|---|---|---|
| 7,439,721 | B2 * | 10/2008 | Weng | H02M 3/156 323/286 |
| 2003/0214276 | A1 * | 11/2003 | Bernardon | H02M 3/1588 323/282 |

(Continued)

FOREIGN PATENT DOCUMENTS

| | | |
|---|---|---|
| JP | 11-089222 A | 3/1999 |
| JP | 2007-202273 A | 8/2007 |
| JP | 2009-254009 A | 10/2009 |

OTHER PUBLICATIONS

International Search Report on related PCT Application No. PCT/US2015/045147 from International Searching Authority (KIPO) dated Dec. 14, 2015.

(Continued)

*Primary Examiner* — Adolf Berhane
(74) *Attorney, Agent, or Firm* — Klein, O'Neill & Singh, LLP

(57) ABSTRACT

The disclosure relates to a method of generating an output voltage from a high input voltage and a command signal, the method comprising: generating an output voltage from a high voltage source; providing an inductor having a first terminal and a second terminal linked to a low voltage source by a capacitor, the second inductor terminal supplying the output voltage to a load; generating command signals as a function of a high voltage supplied by the high voltage source and the output voltage, to reduce a difference between the output voltage and a reference voltage lower than the high voltage; and connecting the first inductor terminal exclusively either to the high input voltage or the low voltage or to the inductor second terminal, as a function of the command signals.

11 Claims, 11 Drawing Sheets

(56) References Cited

U.S. PATENT DOCUMENTS

| | | | |
|---|---|---|---|
| 2008/0291711 A1 | 11/2008 | Williams | |
| 2009/0174379 A1* | 7/2009 | Lima | H02M 3/1588 323/282 |
| 2011/0221407 A1 | 9/2011 | Kato | |
| 2012/0169306 A1* | 7/2012 | Wu | H02M 3/1588 323/271 |
| 2013/0257398 A1* | 10/2013 | Srivastava | H02M 3/156 323/271 |
| 2015/0061615 A1* | 3/2015 | Michishita | H02M 3/1588 323/271 |
| 2015/0076906 A1* | 3/2015 | Tamegai | H02M 3/156 307/31 |
| 2016/0049860 A1* | 2/2016 | Ihs | H02M 3/156 323/282 |

OTHER PUBLICATIONS

Written Opinion on related PCT Application No. PCT/US2015/045147 from International Searching Authority (KIPO) dated Dec. 14, 2015.

* cited by examiner

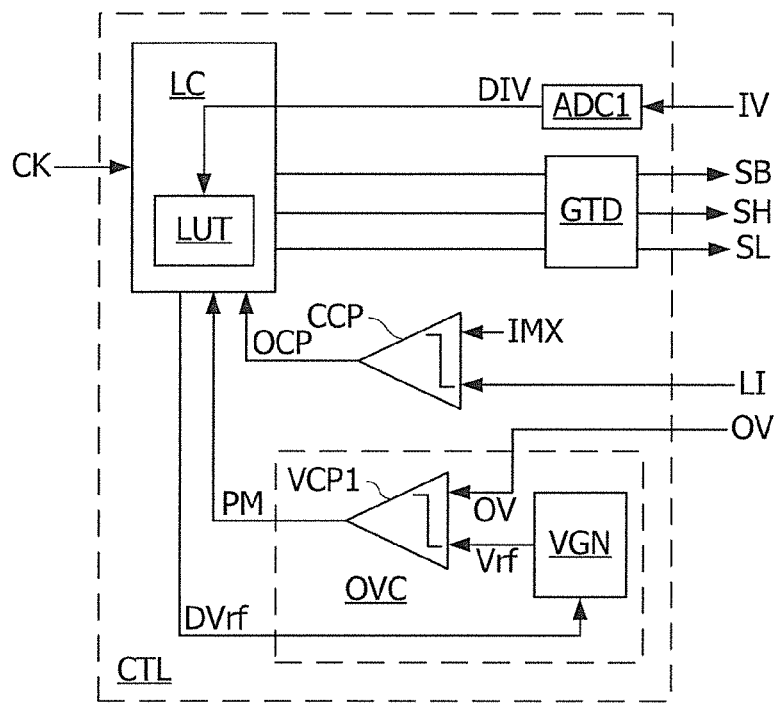
Fig. 4
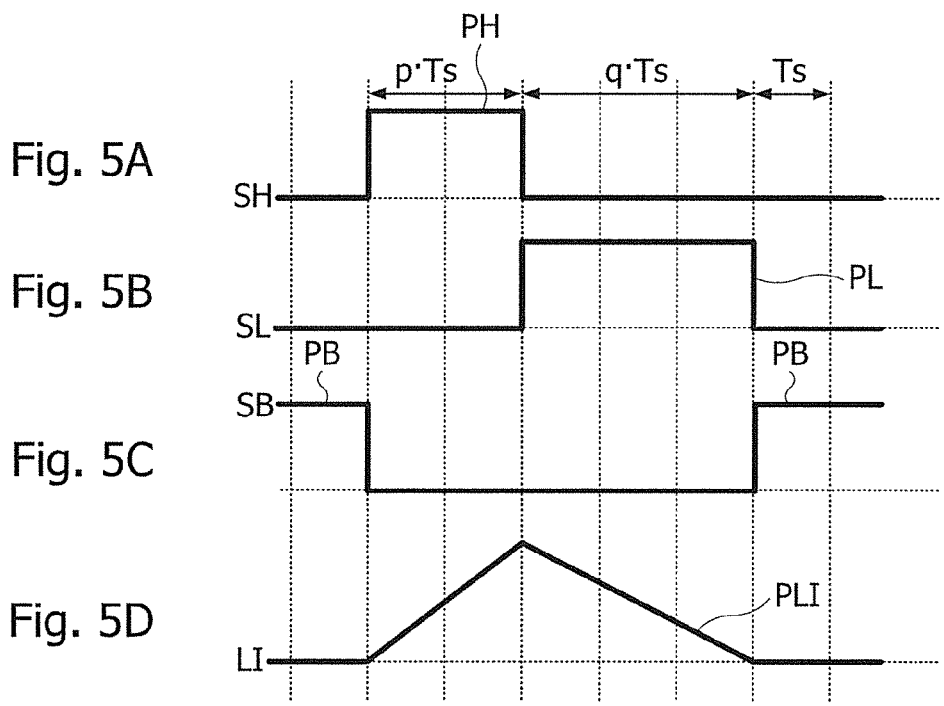
Fig. 5A
Fig. 5B
Fig. 5C
Fig. 5D

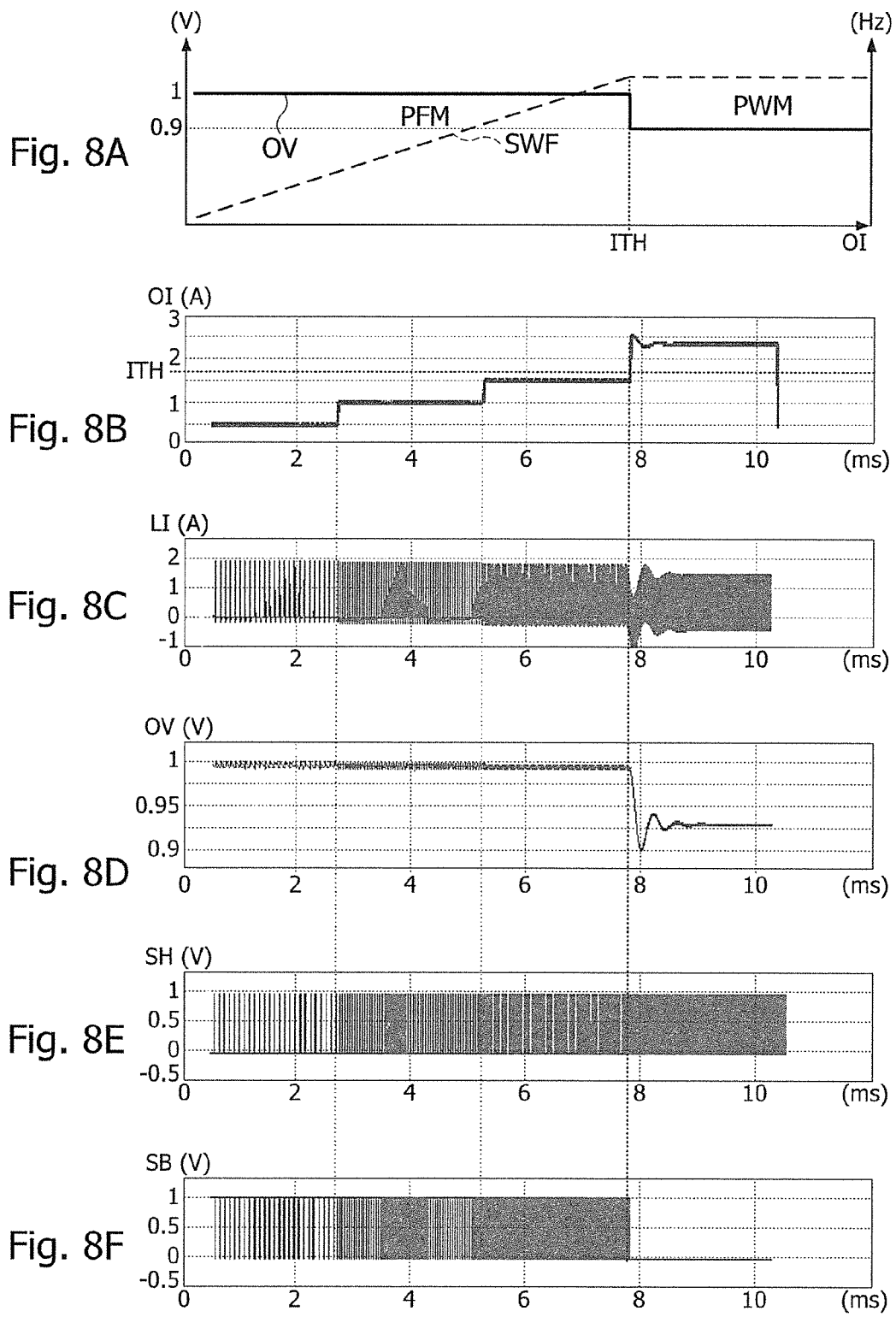

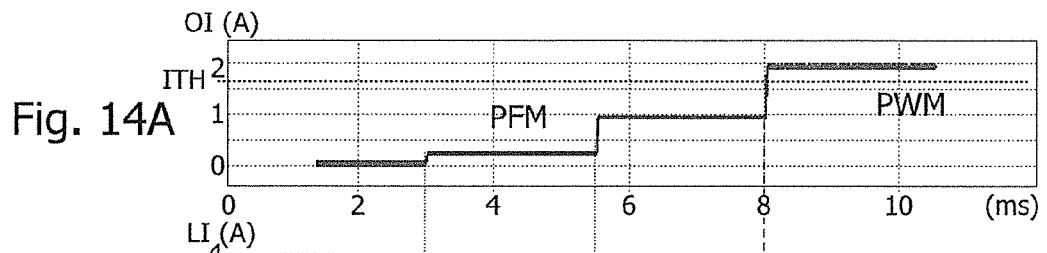
Fig. 14A
Fig. 14B
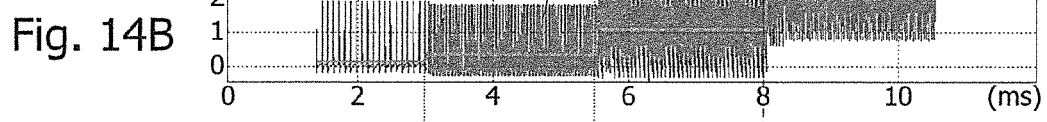
Fig. 14C
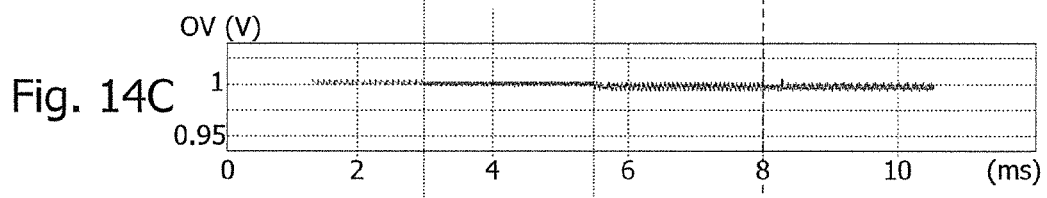
Fig. 14D
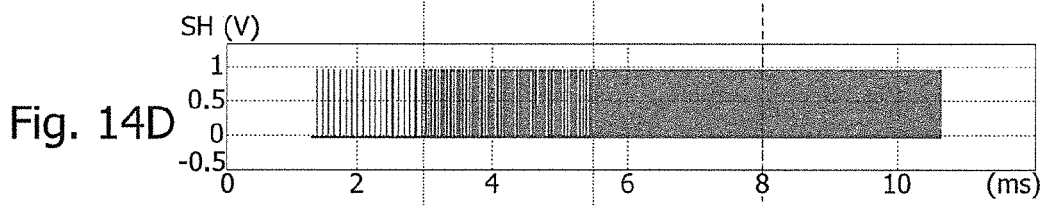
Fig. 14E
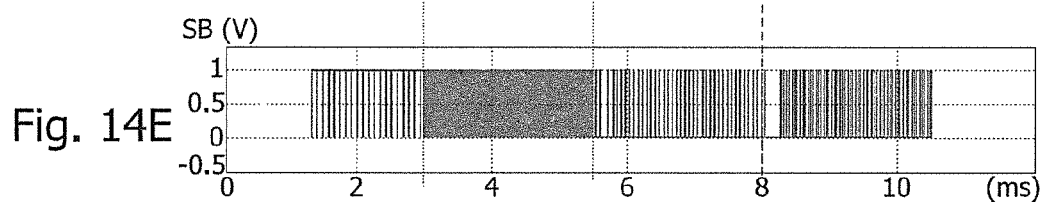
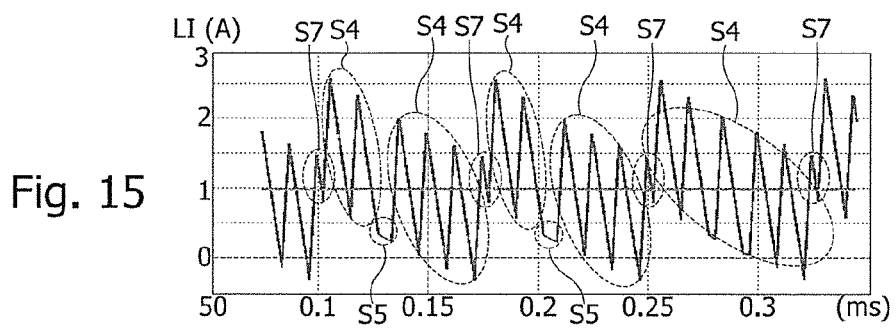
Fig. 15

SWITCHED POWER STAGE AND A METHOD FOR CONTROLLING THE LATTER

CROSS REFERENCE TO RELATED APPLICATIONS

This application claims the benefit of the filing date of U.S. Provisional Patent Application No. 62/037,061, filed on Aug. 13, 2014, the disclosure of which is incorporated by reference herein.

BACKGROUND OF THE INVENTION

The present disclosure generally relates to power stages and voltage converters, and especially to DC-DC converters or switched voltage regulators, capable of varying output voltage and current as a function a processing load of circuits powered by such a converter.

Switched voltage converters are used to convert between differing DC voltages in a wide range of applications. Among switched voltage converters, step-down converters are used to provide a reduced voltage from a higher voltage supply. Typical uses of switched power stages comprise DC-DC converters in particular for battery-operated devices, power stage for class-D amplifiers including audio amplifiers, motor drive circuits, photovoltaic inverters, etc. Such a switched power stage is schematically shown in FIG. 1. The power stage PWS comprises switches SW1, SW2 which are used to alternately connect a first terminal of an inductor L1 to a supply voltage IV and to a k-low voltage such as ground voltage, at a switching frequency. A second terminal of the inductor L1 is connected to a load LD and linked to the ground by a capacitor C1. The switches SW1, SW2 are controlled by respective signals SH and SL provided by a control circuit CTL, so that when the switch SW1 is turned on, the switch SW2 is turned off and conversely.

In battery-operated devices such as mobile phones, smart phones, digital tablets, there is a need to increase the battery life. To this purpose, the circuits of the device that are not used are powered off or receive a reduced power. Thus the supply current requested by the device may dramatically vary. When one or more circuits of the device are deactivated, the current drawn by the device may drop very shortly, thus resulting in a voltage overshoot if the supplied current does not follow this drop. This voltage overshoot may be reduced by increasing the size of the capacitor C1.

In addition to the voltage overshoot, the current ripple of the inductor should to be taken into account to reduce switching core loss of the inductor and keep the peak current within the maximum current rating of the inductor and the battery. The optimization of switching losses while maintaining the average current loads closer to the maximum rating constrains the range of inductor values appropriate for a given input to output voltage ratio and operating frequency. For a DC-DC converter operating with 1 Mhz or slower PWM control, the inductor should typically be sized to 1 µH or larger to meet these constraints. Such a big inductor cannot be compact and integrated in a semiconductor chip. Conversely when a circuit of the powered device is activated, it should be powered on in a very short time, inducing a sudden rise of the current drawn by the device. One way to follow such a current draw is to reduce the size of the inductor L1.

Preferably, components of small height and reduced surface on printed-circuit boards are used to manufacture thin and small devices. This generally serves to reduce the size of inductor L1 and capacitor C1, and thus to increase the commutation frequency of the switches SW1, SW2, which increases the energy losses in the switches.

Further, each new generation of processors used in such portable devices tends to be more powerful while being smaller and operating at lower supply voltages. In addition, to increase their life by reducing the current supplied by each battery cell, the number of battery cells assembled both in series and in parallel within the batteries tends to increase. Accordingly the input voltage of the DC-DC converter tends to increase whereas the output voltage to be supplied to the devices tends to decrease, which requires a bigger inductor. This results in subjecting the inductor to conflicting requirements.

BRIEF SUMMARY OF THE INVENTION

Embodiments of the disclosure relate to a method for operating a switching power regulator, comprising: comparing a regulator output voltage with a first reference voltage; operating the switching power regulator in a pulse frequency modulation (PFM) mode if the regulator output voltage is less than the first reference voltage; comparing the regulator output voltage with a second reference voltage, the second reference voltage greater than the first reference voltage; and operating the switching power regulator in a pulse width modulation (PWM) mode if the regulator output voltage is less than the second reference voltage and greater than the first reference voltage.

Other embodiments of the disclosure relate to a method of generating a regulated voltage, comprising: generating an output voltage from a high voltage source; providing an inductor having a first terminal and a second terminal linked to a low voltage source by a capacitor, the second inductor terminal supplying the output voltage to a load; generating command signals as a function of a high voltage supplied by the high voltage source and the output voltage, to reduce a difference between the output voltage and a reference voltage lower than the high voltage; and connecting the first inductor terminal exclusively either to the high input voltage or the low voltage or to the inductor second terminal, as a function of the command signals; wherein when the output voltage is lower than the reference voltage reduced by a tolerance voltage, the first inductor terminal is connected to the high voltage source for a clock period in accordance with the command signals, and wherein when the output voltage is greater than the reference voltage reduced by a tolerance voltage and lower than the reference voltage, the first inductor terminal is connected to the high voltage source for a first period, and connected to the low voltage source for a second period adjacent to the first period in accordance with the command signals; wherein the first period is the clock period multiplied by a first positive integer number, and the second period is the clock period multiplied by a second positive integer number, the first and second integer numbers being defined such that the ratio of the first integer number to a sum of the first and second integer numbers is lower or equal to the ratio of the output voltage to the high voltage.

Yet other embodiments of the disclosure relate to a switched power stage providing a regulated output voltage, the power stage comprising: an inductor having a first inductor terminal and a second inductor terminal forming an output of the power stage, a capacitor linking the second inductor terminal to the low voltage source, a switching device linking the first inductor terminal exclusively either to a high voltage source, or to a low voltage source, or to the second inductor terminal, and a control circuit for generating command signals controlling the switching device as a function of a high voltage supplied by the high voltage source and the output voltage, to reduce a difference between the output voltage and a reference voltage lower than the high voltage, with the control circuit configured to control the switching device to: connect the first inductor terminal to the high voltage source for a clock period, when the output voltage is lower than the reference voltage reduced by a tolerance voltage, and generate a current pulse in the inductor by connecting the first inductor terminal to the high voltage source for a first period, and connecting the first inductor terminal to the low voltage source for a second period adjacent to the first period, when the output voltage is lower than the reference voltage and greater than the reference voltage reduced by the tolerance voltage.

These and other aspects of the invention are more fully comprehended upon review of this disclosure.

BRIEF DESCRIPTION OF THE FIGURES

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 4 is a circuit diagram of a control circuit of the switched power stage, according to an embodiment, FIGS. 5A, 5B, 5C, 5D show variations curves of signals as a function of time illustrating an operating mode of the switched power stage, according to an embodiment, FIGS. 8A to 8F show variations curves of signals illustrating a first operating case of the switched power stage, FIGS. 14A to 14E show variations curves of signals as a function of time illustrating operation of the switched power stage, when current drawn from the load varies, according to another embodiment, FIG. 15 shows a part of the curve of FIG. 14B stretched out in time.

DETAILED DESCRIPTION

Figure 1:
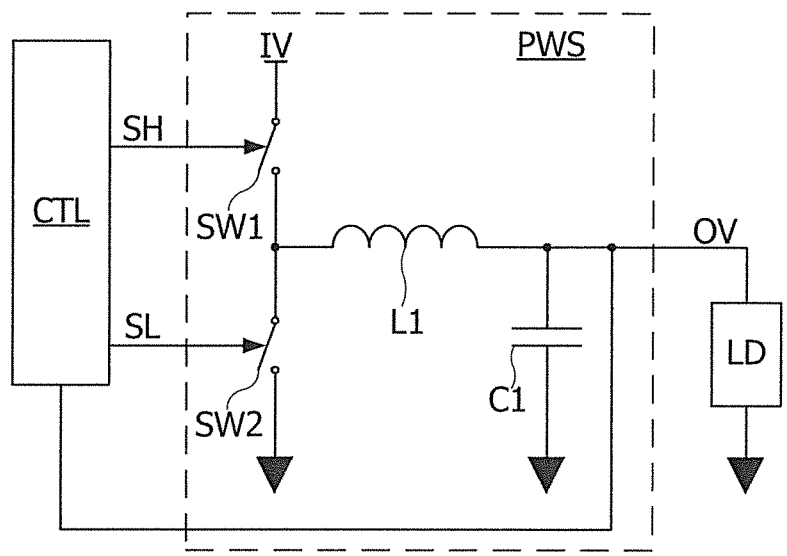
FIG. 1 previously described is a circuit diagram of a conventional switched power stage.
Figure 2:
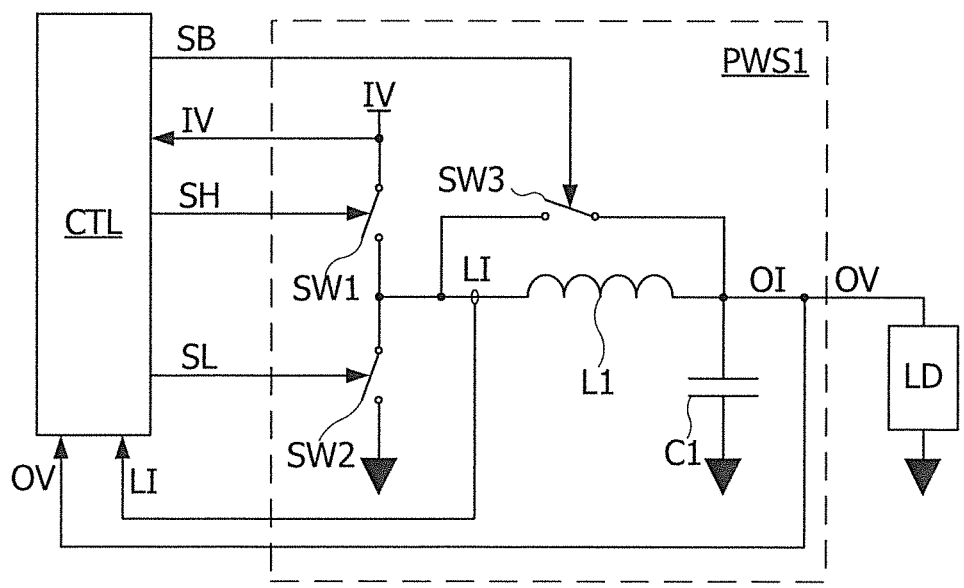
FIG. 2 is a circuit diagram of a switched power stage according to an embodiment.

FIG. 2 is a circuit diagram of a switched power stage according to an embodiment. Referring to FIG. 2, a switched power stage PWS1 of this embodiment, which is a step-down type converter, includes switches SW1, SW2, SW3, an inductor L1, a capacitor C1 and a control circuit CTL controlling the switches SW1, SW2, SW3. A first terminal of the switch SW1 is connected to a voltage source providing an input voltage IV. A second terminal of the switch SW1 is connected to a first terminal of the inductor L1, a first terminal of the switch SW2 and a first terminal of the switch SW3. A second terminal of the switch SW2 is connected to a low voltage source, e.g. the ground. A second terminal of the inductor L1 is connected to a second terminal of the switch SW3, and to a first terminal of the capacitor C1, which supplies an output voltage OV to a terminal of a load LD having another terminal connected to the ground. The output voltage OV is lower than the input voltage IV. The second terminal of the capacitor C1 is connected to the ground. The control circuit CTL may receive a measure signal of output voltage OV an input voltage IV. In some embodiments, current intensity measures of the current LI flowing through the inductor L1 may be provided to the control circuit CTL with input and output voltages IV, OV. In some embodiments a measure signal of a current intensity of the current OI flowing through load LD could also be provided to control circuit CTL. The control circuit CTL outputs control signals SH, SL and SB, for controlling the switches SW1, SW2 and SW3, respectively. The control circuit CTL is configured to generate the control signals SH, SL, SB as a function of input and output voltages IV, OV, and the inductor current LI, and possibly the load current OI. The control signals SH, SL, SB are exclusive in closing the switches SW1, SW2, SW3, so that at any time not more than one of the switches SW1, SW2, SW3 is closed whereas the others of the switches SW1, SW2, SW3 are open. For this to happen, the control circuit CTL may turn off all the switches SW1, SW2, SW3 before turning on one of the latter. However some applications may require simultaneous closing of the switches SW3 and SW1 or SW3 and SW2. Such a control of switches does not generate any power loss, in contrast with simultaneous closing of the switches SW1 and SW2 which would directly link the voltage source IV to ground.

For example, the switches SW1, SW2, SW3 may be formed with MOSFET transistors, with a p-channel MOS transistor forming the switch SW1 and n-channel MOS transistors forming the switches SW2 and SW3. Measurement of the inductor current LI could be performed in any one the switches SW1, SW2 and SW3.

Figure 3A:
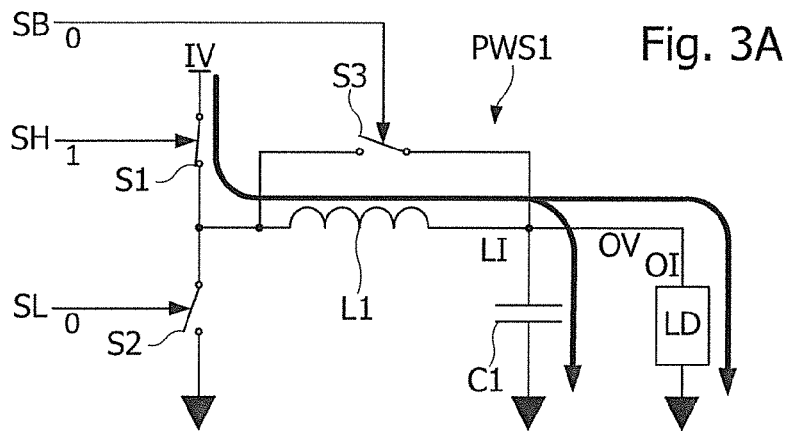
FIGS. 3A, 3B, 3C are simplified circuit diagrams of the switched power stage, illustrating operating modes of the power stage.
Figure 3B:
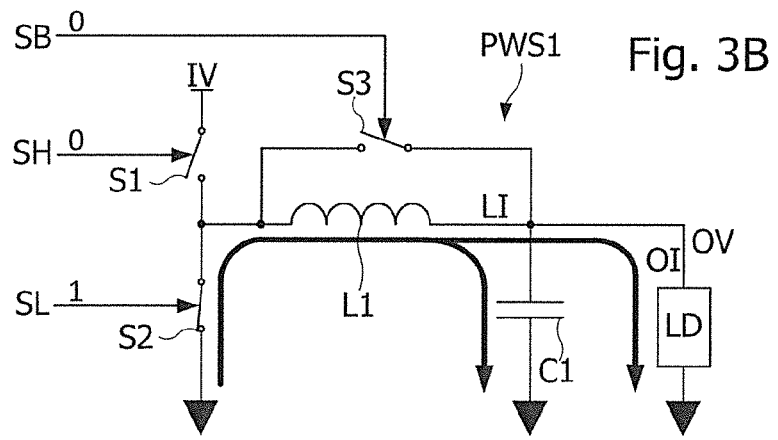
Figure 3C:
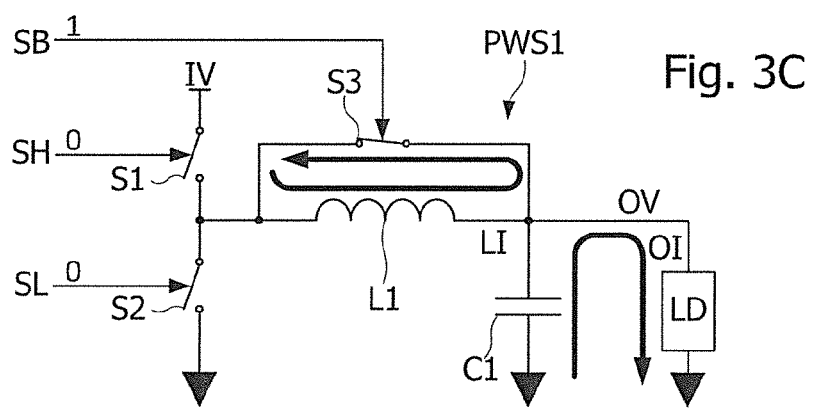

FIGS. 3A, 3B, 3C illustrate the operation of the switched power stage PWS1. In FIG. 3A, the switch SW1 is turned on, whereas the switches SW2 and SW3 are open. Thus a current flows from the voltage source supplying input voltage IV to the ground the inductor L1, through the capacitor C1 which charges and through the load LD.

In FIG. 3B, the switch SW2 is turned on, whereas the switches SW1 and SW3 are open. Thus a current flows through the inductor L1, through capacitor C1 which discharges and through the load LD to the ground.

In FIG. 3C, the switch SW3 is turned on, whereas switches SW1 and SW2 are open. Thus current flows in the loop formed by the inductor L1 and the capacitor C1 discharges through the load LD. In this state, the load current OI is exclusively supplied by capacitor C1.

FIG. 4 is a circuit diagram of the control circuit CTL according to an embodiment. The control circuit CTL comprises a logic circuit LC, an analog-to-digital converter ADC1, a current comparator CCP, a gate drive circuit GTD1 and a voltage comparator circuit OVC. The converter ADC1 receives the input voltage IV and converts this voltage into a digital signal DIV representative of the value of the voltage IV. The input voltage digital signal DIV is provided to the logic circuit LC. The current comparator CCP receives the current LI from the inductor L1 and a current maximum value IMX and provides to the logic circuit LC a binary signal OCP, for example equal to 1 or 0, as a function of the comparison result of the inductor current LI with the maximum value IMX. The circuit OVC comprises a reference voltage generator VGN and a voltage comparator VCP1. The comparator VCP1 receives the output voltage OV and a reference voltage Vrf from the generator VGN, and provides to the logic circuit LC a binary signal PM, for example equal to 1 or 0, as a function of the comparison result of the output voltage OV with the reference voltage Vrf. The value of the reference voltage Vrf may be adjusted by a digital signal. DVrf corresponding to a digital value of the reference voltage Vrf, provided by the logic circuit LC to the voltage comparator circuit OVC. The logic circuit LC may include a look-up table LUT providing regulation parameters as a function of the digital values DIV and DVrf of the input voltage IV and the reference voltage Vrf. The logic circuit CTL receives a clock signal CK and is configured to generate the control signals SH, SL, SB as a function of the signals OCP and PM. The gate drive circuit GTD1 is configured to appropriately adapt the control signals SH, SL, SB to control switches SW1, SW2 and SW3. The gate drive circuit GTD may be omitted is the switches SW1, SW2 and SW3 can be controlled directly by logical signals generated by the logic circuit LC. The logic circuit LC may be a wired logic circuit.

FIGS. 5A, 5B, 5C and 5D show variations curves of signals as a function of time, illustrating operation of the control circuit CTL and the power stage PWS1. According to an embodiment, the control circuit CTL is configured to send series of consecutive pulses PH, PL having a square shape on its outputs SH, SL to obtain current pulses PLI in the inductor L1, the current pulses PLI having a saw-tooth or triangular waveform. FIG. 5A represents one of the pulses PH of the signal SH, FIG. 5B represents one of the pulses PL of the signal SL, FIG. 5C represents pulses PB of the signal SB and FIG. 5D represents a corresponding pulse PLI of the current LI in the inductor L1. The inductor current LI is null during the pulses PB. The rising edge of the pulse PLI corresponds to the pulse PH, and the falling edge of the pulse PLI corresponds to the pulse PL. The slope of the rising edge of the pulse PLI is determined by the duration p·Ts of the pulse PH and the slope of the falling edge of the pulse PLI corresponds to the duration q·Ts of the pulse PL, p and q being positive integer numbers and Ts being the period of the clock signal CK or another clock signal derived from the clock signal CK and defining a timing resolution. Thus the period Ts may be chosen as small as possible to get small parasitic capacities and inductances. In contrast, the numbers p and q may be chosen large enough to obtain pulses PLI in the inductor L1 large enough for the pulse being not be filtered out by the power stage PWS1. The durations p·Ts and q·Ts should be greater than the switching time of the switches SW1, SW2, SW3 (for example greater than 10 ns). If the switches SW1, SW2, SW3 are implemented by MOSFET transistors, the durations p·Ts and q·Ts should be greater than the switching time of the transistors. The numbers p and q are defined by the look-up table LUT as a function of the digital values DIV, DVrf of the input voltage IV and the reference voltage Vrf. The reference voltage Vrf may have a fixed value. Then the table LUT is configured to provide the numbers p and q as a function of the value DIV only.

Figure 6:
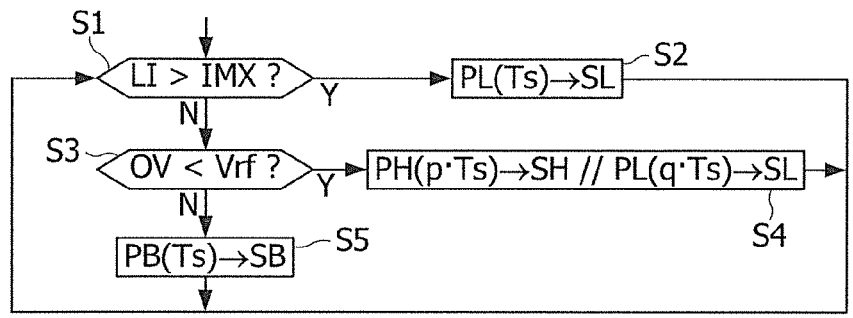
FIG. 6 is a flow chart of a process implemented in the control circuit of the switched power stage, according to an embodiment.

FIG. 6 is a flow chart of an example of a process executed by the logic circuit LC to control the switches SW1, SW2, SW3, according to an embodiment. This process comprises steps S1 to S5. At step S1, the inductor current intensity LI is compared with a maximum value IMX. If the current intensity LI is greater than the maximum value IMX, step S2 is performed, otherwise step S3 is performed. At step S2, a pulse PL is sent to the output SL to control the switch SW2. At step S3, the output voltage OV is compared with the reference voltage Vrf. If the output voltage OV is lower than the reference voltage Vrf, step S4 is performed, otherwise step S5 is performed. At step S4, pulses PH and PL are successively sent to the outputs SH and SL, respectively, to generate a pulse PLI in the inductor current LI as shown in FIGS. 5A, 5B and 5D. At step S5, a pulse PB is sent to the output SB. The process is performed again from step S1 after steps S2, S4 and S5. Thus the switched power stage PWS1 is mainly controlled according to two distinct modes, namely a pulse frequency modulation mode (PFM), and a pulse width modulation mode (PWM). The PFM mode is activated when the current OI drawn by the load LD is lower than a current threshold ITH. In this mode, steps S1, S3, and alternately steps S4 and S5 are carried out. The PWM mode is activated when the current OI drawn by the load LD is greater than the current threshold ITH. In this mode, only steps S1, S3 and S4 are carried out. Step S2 may be carried out at any time when needed to avoid over currents in the inductor L1.

The comparison performed at step S1, may be performed by the comparator CCP. Thus step S1 may comprise or consist in testing the binary signal OCP. In a same manner, the comparison performed at step S3 may be performed by the comparator VCP1. Thus the step S3 may comprise or consist in testing the binary signal PM.

Figure 7A:
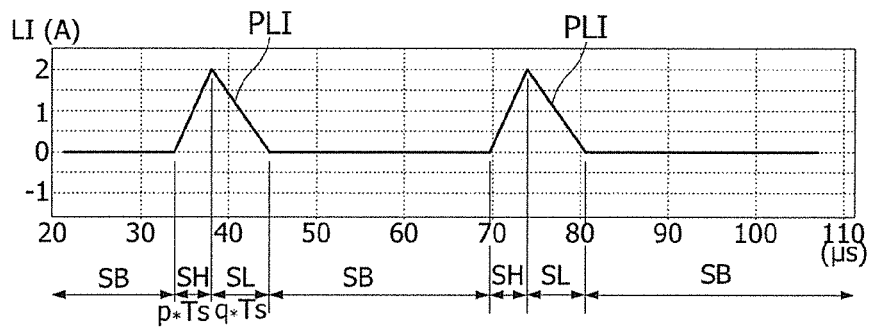
FIGS. 7A, 7B, 7C show variations curves of signals as a function of time illustrating operation of the switched power stage, when current drawn from the load varies.
Figure 7B:
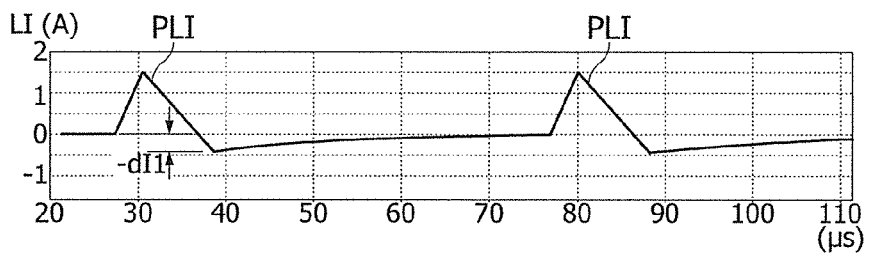
Figure 7C:
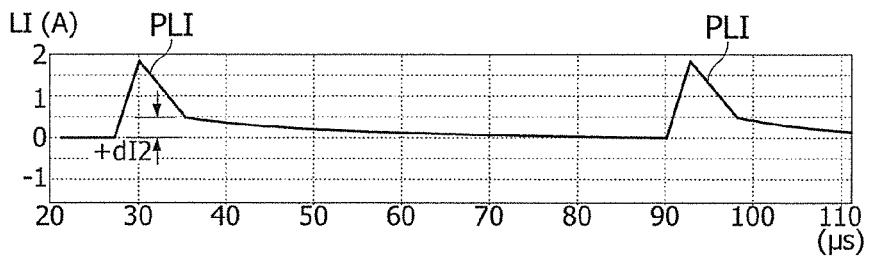

FIGS. 7A, 7B, 7C show variations curves of the inductor current LI as a function of time, when the switched power stage PWS1 is controlled in pulse frequency modulation mode (PFM), i.e. when the current OI drawn by the load LD is lower than the current threshold ITH. FIG. 7A corresponds to the ideal case which is an instable state for the switched power stage PWS1. In this case the ratio OV/IV of the output voltage OV to the input voltage IV is equal to the ratio p/(p+q), p·Ts being the duration of the pulse PH (i.e. the time when the switch SW1 is closed) and q·Ts being the duration of the pulse PL (i.e. the time when the switch SW2 is closed). The time between two pulses PLI corresponds to the time when the switch SW3 is closed. More generally the switched power stage PWS1 controlled in PFM mode operates as represented by FIGS. 7B and 7C due to variations of the current OI drawn by the load LD. In FIG. 7B, the current LI reaches a negative value −dI1 at the end of the pulse PLI. Then in a standby state, i.e. when switch SW3 is closed, the current LI progressively reaches 0 A. In the operating case of FIG. 7B, the ratio OV/IV the output voltage OV to the input voltage IV is greater than the ratio p/(p+q). In FIG. 7C, the current LI remains at a positive value +dI2 at the end of the pulse PL. Then in the standby state, when switch SW3 is closed, the current LI progressively reaches 0 A. In the operating case of FIG. 7C, the ratio OV/IV of the output voltage OV to the input voltage IV is smaller than the ratio p/(p+q).

FIGS. 8A to 8F show variation curves of signals illustrating a first operating case of the switched power stage PWS1, the current OI drawn by the load increasing by steps. In this operating case, the values of the parameters p and q are defined by the look-up table LUT such that the pulses PLI generated in the current LI have the form shown in FIG. 7B, i.e. the falling edge of the pulses PLI in the inductor current LI reaches a negative value. FIG. 8A shows theoretical curves of the output voltage OV and the switching frequency SWF of the switches SW1, SW2, SW3 as a function of the output current OI. FIG. 8B shows variations of the output current OI drawn by the load LD as a function of time. FIG. 8C shows variations current LI in the inductor L1 as a function of time. FIG. 8D shows variations of the output voltage OV as a function of time. FIGS. 8E and 8F show variations of the signals SH, SB controlling the switches SW1 and SW3, respectively, as a function of time. In FIG. 8B, the output current OI grows by steps in three steps from about 0.5 A to 2.5 A. In FIGS. 8A and 8D, the output voltage OV is regulated close to the set point value defined by the reference voltage Vrf (=1 V in the example of FIGS. 8A and 8D) until the current reaches a current threshold ITH. Before the output current OI reaches the current threshold ITH, the power stage PWS1 is operated in PFM mode, and the switching frequency SWF (i.e. frequency of pulses PLI) linearly increases as a function of the output current OI (see FIGS. 8A, 8E and 8F). In PFM mode, the frequency SWF may be defined by the following equation:

$$SWF=(2L \cdot OI)/(OV \cdot p \cdot q \cdot Ts^2) \quad (1)$$

where L is the inductance of the inductor L1. The current threshold ITH may be defined by the following equation:

$$ITH=(IV \cdot p \cdot q \cdot Ts)/(2L \cdot (p+q)) \quad (2)$$

Figure 9:
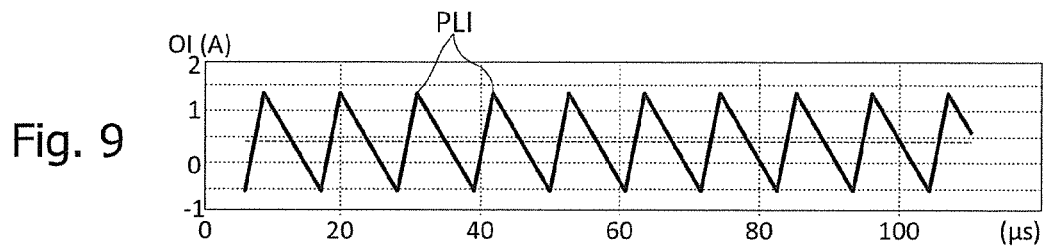
FIG. 9 shows a part of the curve of FIG. 8B stretched out in time.

A view stretched out in time of the current LI when the current OI is greater than the current threshold value ITH is shown in FIG. 9. As long as the output current OI remains above the current threshold ITH, the power stage PWS1 is operated in PWM mode. In this mode, the pulses PLI are successively generated without carrying out step S5 between them, the switch SW3 being kept open. When the output current OI is greater than the current threshold ITH, the switching frequency SWF remains at a constant value defined by the following equation:

$$SWF=1/((p+q) \cdot Ts) \quad (3)$$

(p+q)·Ts corresponding to the duration of the pulses PLI. When the output current OI reaches the threshold ITH, the output voltage OV undergoes a drop from the reference voltage Vrf (≈1 V) to about 90% of the voltage Vrf with an undershoot before reaching and remaining at about 93% of the voltage Vrf. Therefore, in PWM operating mode, it is not possible to reach the set point value Vrf, even with the switch SW3 kept open. This is due to regulation and commutation losses appearing when the output current OI drawn by the load LD is high (above the current threshold ITH).

Figure 10A:
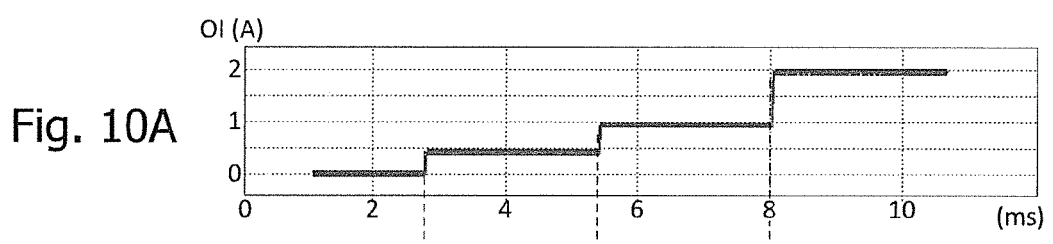
FIGS. 10A, 10B, 10C show variations curves of signals as a function of time illustrating operation of the switched power stage, when current drawn from the load varies in a second operating case.
Figure 10B:
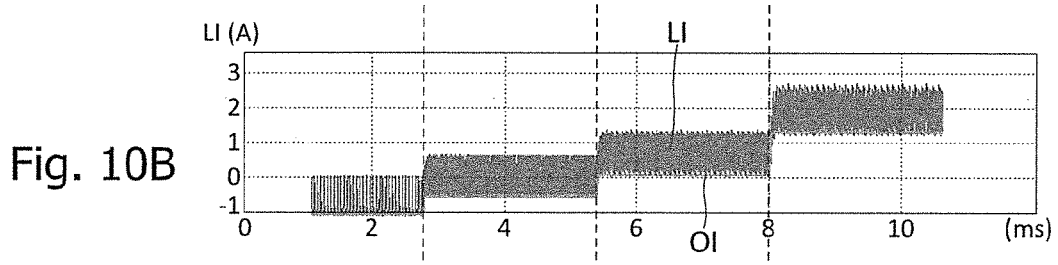
Figure 10C:
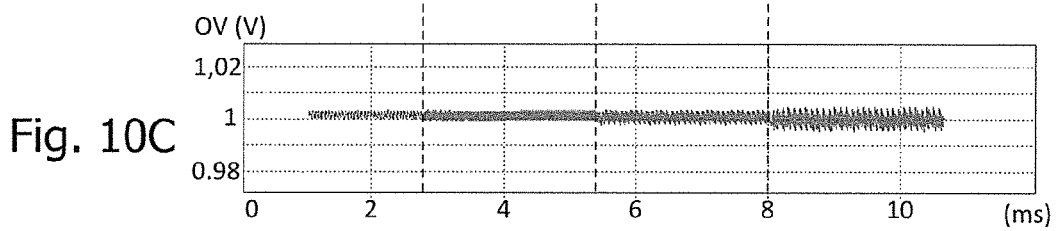
Figure 11:
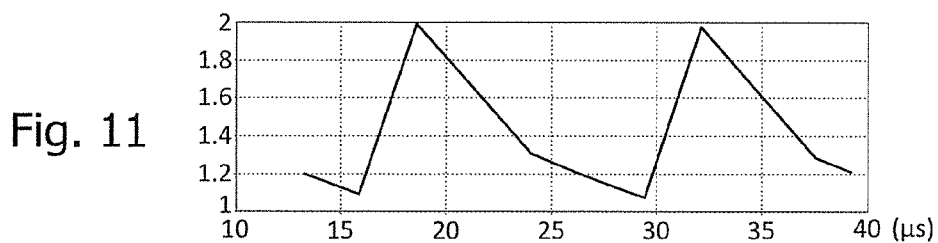
FIG. 11 shows a part of the curve of FIG. 10B stretched out in time.

FIGS. 10A to 10C show variation curves of signals as a function of time, illustrating a second operating case of the switched power stage PWS1, the current OI drawn by the load increasing by steps. In this operating case, the pulses PLI generated in the current LI have the form shown in FIG. 7C, i.e. the falling edge of the pulses PLI only reaches a positive value. FIG. 10A shows variations of the output current OI drawn by the load LD. FIG. 10B shows variations of the inductor current LI and the output current OI. FIG. 10C shows variations of the output voltage OV. In FIGS. 10A and 10B, the output current OI grows by steps in three steps from about 0.5 A to 2 A. In FIG. 10C, the output voltage OV is regulated close to the reference voltage Vrf (≈1 V), for example at a value less than 1% from the reference voltage. In FIG. 11 showing a view stretched out in time of the current LI, the pulses PLI generated in the current LI have the form shown in FIG. 7C. In this operating case, the power stage PWS1 is always operated in PFM mode, since the output voltage OV is sometimes greater than the reference voltage Vrf, regardless the output current OI with respect to the current threshold ITH. In this operating case, the inductor current LI remains higher than the output current OI. This results in closing and opening the switch SW3 at a high rate even when the output current OI is greater than the current threshold ITH. Thus this operating case can produce high conduction losses.

According to an embodiment, the look-up table LUT is defined so as to avoid the operating case in which the falling edge of the pulses PLI only reaches a positive value (FIGS. 7C and 11). Thus the table LUT specifies values of parameters p and q such that p/(p+q)≤OV/IV (≈6 Vrf/IV).

Figure 12:
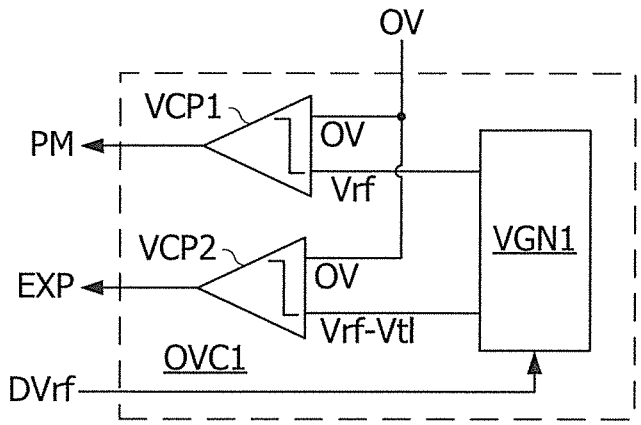
FIG. 12 is a circuit diagram of a circuit of the control circuit, according to another embodiment.

FIG. 12 is a circuit diagram of the voltage comparator circuit according to another embodiment. The voltage comparator circuit OVC1 of FIG. 12 comprises a reference voltage generator VGN1, the voltage comparator VCP1 and another voltage comparator VCP2. The generator VGN1 is configured to generate a first reference voltage Vrf and a second reference voltage which may be derived from the reference voltage, e.g. equal to Vrf-Vtl. The voltage Vtl may be set to a fraction of the reference voltage Vrf, smaller than an admitted regulation error for the output voltage OV. The voltage Vtl is set for example to a value in the interval from 0.5% to 1.5% of the reference voltage Vrf. The comparator VCP1 receives the output voltage OV and the first reference voltage Vrf from the generator VGN1. The comparator VCP1 provides to the logic circuit LC the binary signal PM, for example equal to 1 or 0, as a function of the comparison result of the output voltage OV with the first reference voltage Vrf. The comparator VCP2 receives the output voltage OV and the second reference voltage Vrf-Vtl from the generator VGN1. The comparator VCP2 provides to the logic circuit LC a binary signal EXP for example equal to 1 or 0, as a function of the comparison result of the output voltage OV with the second reference voltage Vrf-Vtl.

Figure 13:
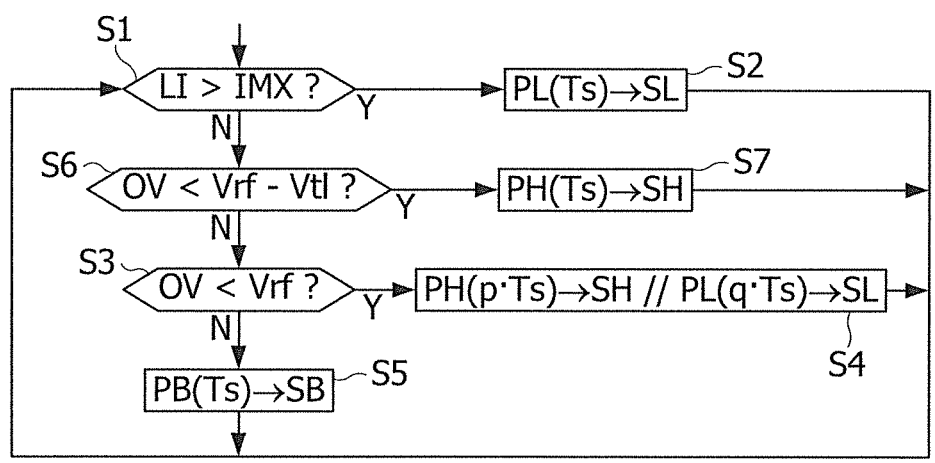
FIG. 13 is a flow chart of another example of a process implemented in the control circuit of the switched power stage, according to another embodiment.

FIG. 13 is a flow chart of an example of a process executed by the logic circuit LC of the switched power stage PWS1 to control switches SW1, SW2, SW3, according to another embodiment. This process comprises steps S1 to S5 as previously described referring to FIG. 6, and additional steps S6 and S7. Step S6 is performed after step S1 and before step S3, when the inductor current LI is not greater than the maximum value IMX. At step S6, the output voltage OV is compared with the second reference voltage Vrf Vtl. If the output voltage OV is lower than the second reference voltage Vrf Vtl, step S7 is performed, otherwise step S3 is performed. At step S7, the switch SW1 is closed for the period Ts. The process is performed again from step S1 after steps S2, S4, S5 and S7. The comparison performed at step S6 may be performed by the voltage comparator VCP2, the step S6 then comprising or consisting in testing the value of the binary signal EXP. Thus step S3 is carried out only when the output voltage OV is greater than or equal to the second reference voltage Vrf-Vtl and lower than the first reference voltage Vrf.

FIGS. 14A to 14E show variation curves of signals as a function of time, illustrating the behavior of the switched power stage PWS1, when the logic circuit LC performs the process of FIG. 13 and the current OI drawn by the load is increased by steps. In the operating case illustrated by FIGS. 14A to 14E, the values of the parameters p and q are defined by the look-up table LUT such that the pulses PLI generated in the current LI have the form shown in FIG. 7A or 7B, i.e. the end of falling edge of the pulses PLI is null or negative. FIG. 14A shows the variations of the output current OI drawn by the load LD. FIG. 14B shows the variations of the inductor current LI and the output current OI. FIG. 14C shows the variations of the output voltage OV. FIGS. 14D and 14E show the variations of the signals SH, SB controlling the switches SW1 and SW3, respectively. In FIG. 14A, the output current OI grows by steps in three steps from about 0.5 A to 2.5 A (above the current threshold value ITH). In FIG. 14C, the output voltage OV is regulated close to the set point value defined by the reference voltage Vrf (=1 V in the example of FIG. 14C) even when the output current OI reaches and exceeds the current threshold ITH. When the output current OI is lower than the current threshold ITH, the power stage is operated in PFM mode. The switching frequency of the switches SW1 (FIG. 14D), SW2 and SW3 (FIG. 14E) is increased as the output current OI drawn by the load LD increases. When the output current OI exceeds the current threshold value ITH, the power stage PWS1 is operated in PWM mode. A view stretched out in time of the inductor current LI variations when the output current OI exceeds the current threshold value ITH is shown in FIG. 15. FIG. 15 shows when steps S4, S5 and S7 are performed. The pulses PH introduced at step S7 avoid the drop of the output voltage OV appearing in FIG. 8D when the output current OI exceeds the current threshold ITH.

It should be observed in FIG. 14B that the inductor current LI has an average value substantially following the output current OI. Thus the power stage PWS1 has an improved efficiency due to lower conduction losses even when a high current OI is drawn by the load LD.

Figure 16A:
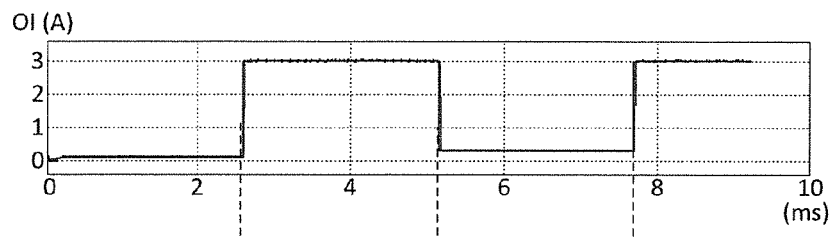
FIGS. 16A, 16B, 16C show variations curves of signals as a function of time illustrating operation of the switched power stage, when current drawn from the load varies in a fifth operating mode, according to an embodiment.
Figure 16B:
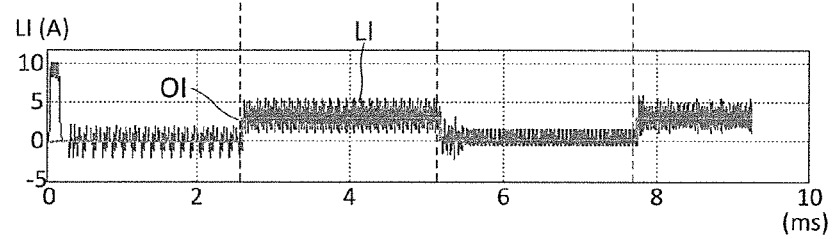
Figure 16C:
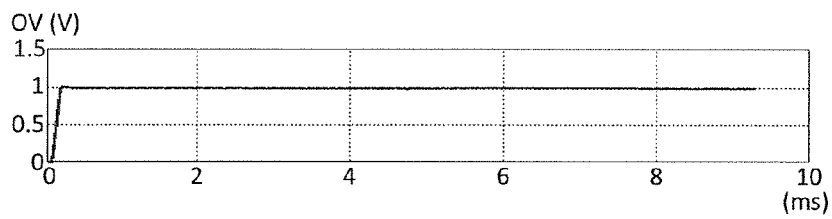

FIGS. 16A to 16C show variation curves of signals as a function of time, illustrating the behavior of the switched power stage PWS1 when the current OI drawn by the load is varied by steps to be successively equal to respective low and high values, the logic circuit LC performing the process of FIG. 13. In the operating case illustrated by FIGS. 16A to 16C, the values of the parameters p and q are defined by the look-up table LUT such that the pulses PLI generated in the current LI have the form shown in FIG. 7A or 7B, i.e. the end of the falling edge of the pulses PLI is null or negative. FIG. 16A shows the variations of the output current OI drawn by the load LD. FIG. 16B shows the variations of the inductor current LI and the output current OI. FIG. 16C shows the variations of the output voltage OV. When the power stage PWS1 is powered on, the inductor L1 undergoes a current jump reaching about 10 A (FIG. 16B). For that time, the output voltage OV rises up to the reference voltage Vrf (about 1 A). At first and third steps, the output current OI remains below 0.2 A, and the inductor current LI fluctuates between −0.2 and +0.2 A. At second and fourth steps, the output current OI jumps to about 3 A. At these steps, the output voltage OV is regulated at the voltage Vrf with variations lower than +/−1% of the reference voltage. At each occurrence of an overvoltage in the output voltage OV, the inductor current LI is set into a free-wheeling state by means of the switch SW3 which is closed. Thus the capacitor C1 is not charged anymore and the output voltage OV starts to decay until it is regulated again by switching the switches SW1, SW2, SW3. The inductor L1 act as a simple charge pump and the regulation loop of the output voltage is of the first order. Current flows either from the switch SW1 to the load LD or from the load to the switch SW2 or does not flow at all. Therefore the regulation takes place around a stable balance point.

Figure 17A:
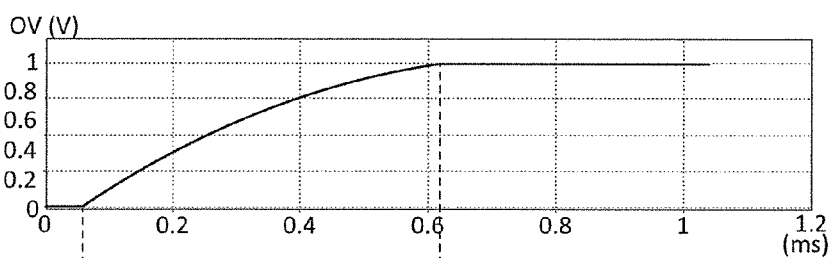
FIGS. 17A, 17B, 17C show variations curves of signals as a function of time illustrating operation of the switched power stage, at power on under high current drawn by the load, according to an embodiment.
Figure 17B:
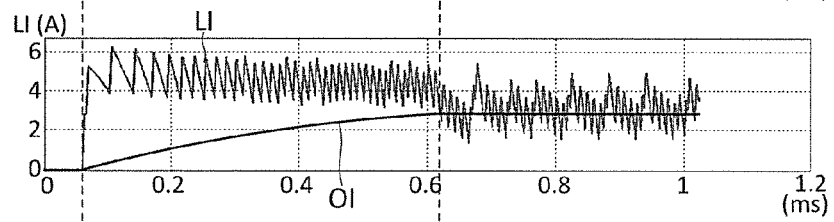
Figure 17C:
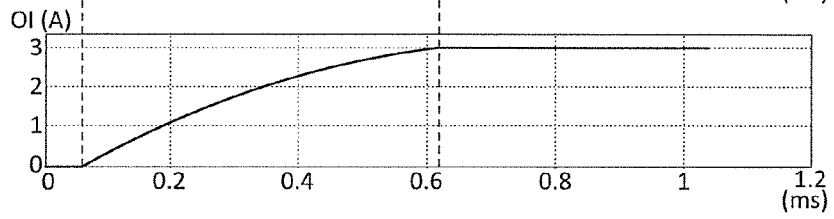

FIGS. 17A to 17C show variation curves of signals as a function of time, illustrating the behavior of the switched power stage PWS1 at startup under high load current OI, the logic circuit LC performing the process of FIG. 13. In the operating case illustrated by FIGS. 17A to 17C, the values of the parameters p and q are defined by the look-up table LUT such that the end of the falling edge of the pulses PLI is null or negative (the pulses PLI have the form shown in FIG. 7A or 7B). FIG. 17A shows the variations of the output current OI drawn by the load LD. FIG. 17B shows the variations of the inductor current LI and the output current OI. FIG. 17C shows the variations of the output voltage OV. In FIG. 17A, the output voltage OV grows from 0 V to the reference voltage Vrf (set to 1 V). For this time, the output current OI grows from 0 A to 3 A. When the output voltage OV begins to grow, the inductor current LI jumps from 0 A to about 5 A, and then varies forming saw teeth between about 4 and 6 A, the frequency of the saw teeth increasing until the output voltage OV reaches the reference voltage Vrf. When the output voltage OV reaches the reference voltage Vrf, the output current OI and voltage OV do not show any overshoot and remain substantially constant.

Figure 18A:
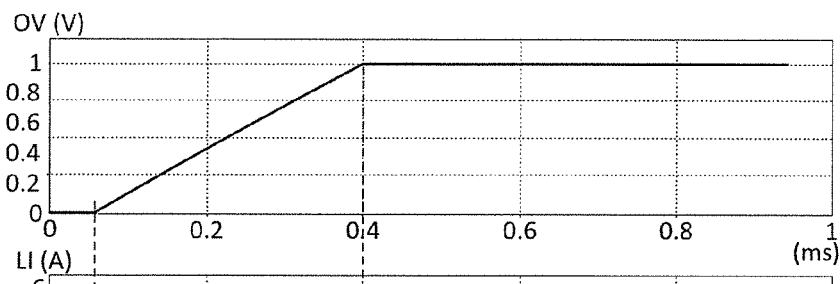
FIGS. 18A, 18B, 18C show variations curves of signals as a function of time illustrating operation of the switched power stage, at power on under low current drawn by the load, according to an embodiment.
Figure 18B:
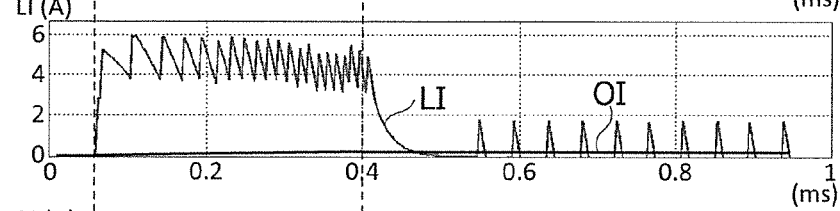
Figure 18C:
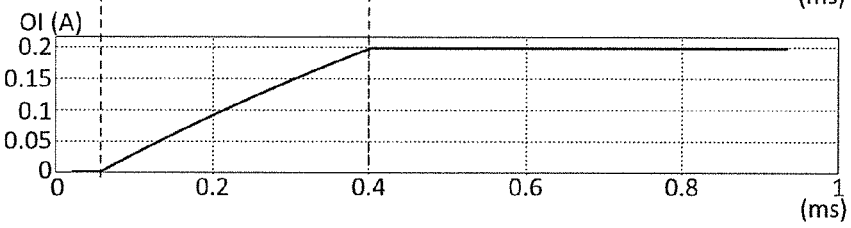

FIGS. 18A to 18C show variation curves of signals as a function of time, illustrating the behavior of the switched power stage PWS1 at startup under low load current OI, the logic circuit LC performing the process of FIG. 13. In this operating case, the values of the parameters p and q are defined by the look-up table LUT such that the pulses PLI generated in the current LI have a falling edge reaching 0 A or a negative value (as shown in FIG. 7A or 7B). FIG. 18A shows the variations of the output current OI drawn by the load LD. FIG. 18B shows the variations of the inductor current LI and the output current OI. FIG. 18C shows the variations of the output voltage OV. In FIG. 18A, the output voltage OV grows linearly from 0 V to the reference voltage Vrf (set to 1 V). For this time, the output current OI grows linearly from 0 A to 0.2 A. When the output voltage OV begins to grows, the inductor current LI jumps from 0 A to about 5 A, and then varies forming saw teeth between about 3.5 and 6 A, the frequency of the saw teeth increasing until the output voltage OV reaches the reference voltage Vrf. When the output voltage OV reaches the reference voltage Vrf, the output voltage OV is regulated in PFM mode and remains substantially constant without any overshoot together with the output current OI, whereas the inductor current LI varies showing pulses PLI separated by periods for which the switch SW3 is closed.

Figure 19A:
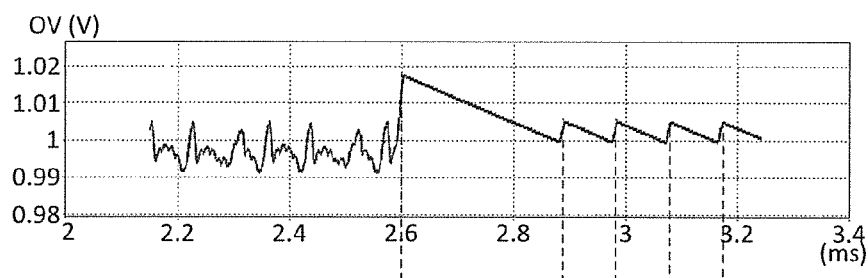
FIGS. 19A, 19B, 19C show variations curves of signals as a function of time illustrating operation of the switched power stage, under a fast from high to low transition of the current drawn by the load, according to an embodiment.
Figure 19B:
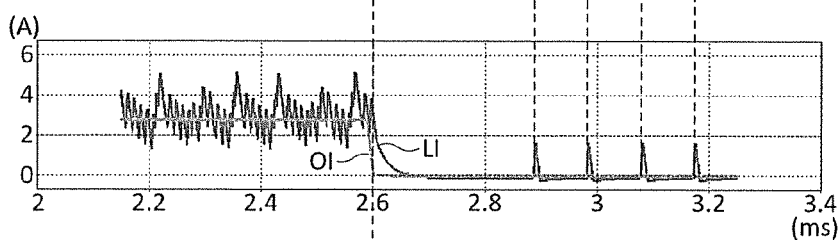
Figure 19C:
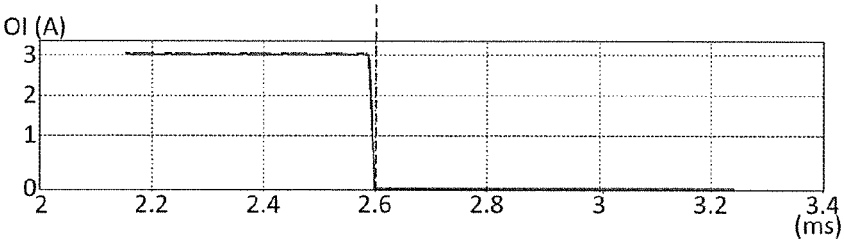

FIGS. 19A to 19C show variation curves of signals as a function of time, illustrating the behavior of the switched power stage PWS1 under a drop of the output current OI drawn by the load LD, the logic circuit LC performing the process of FIG. 13. In the operating of FIGS. 19A to 19C, the values of the parameters p and q are defined by the look-up table LUT such that the pulses PLI generated in the current LI have a falling edge reaching 0 A or a negative value (as shown in FIG. 7A or 7B). FIG. 19A shows the variations of the output current OI drawn by the load LD. FIG. 19B shows the variations of the inductor current LI and the output current OI. FIG. 19C shows the variations of the output voltage OV. In FIG. 19C, the output current OI is established at 3 A. In FIG. 19A, the output voltage is regulated (between 0.99 and 1.1 V) at the reference voltage Vrf set to 1 V. For that time, the inductor current LI in FIG. 19B shows that the operating mode PWM is activated with corrections performed at step S7. Then the output current OI falls to about 0 A. At this time, the output voltage OV shows a small jump to less than 1.02 V and then is regulated between 1 and 1.01 V. For that time, the inductor current LI in FIG. 19B shows pulses PLI separated by pulses PB revealing that the operating mode PFM is activated.

Figure 20A:
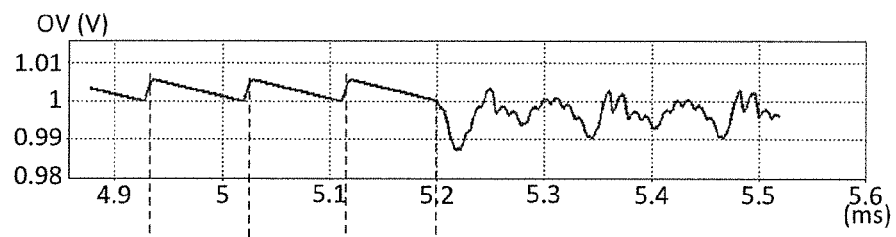
FIGS. 20A, 20B, 20C show variations curves of signals as a function of time illustrating operation of the switched power stage, under a fast low to high transition of the current drawn by the load, according to an embodiment.
Figure 20B:
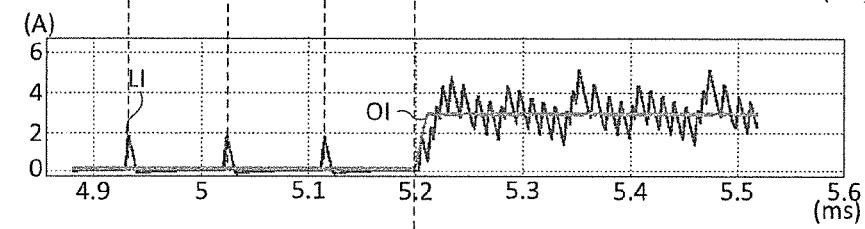
Figure 20C:
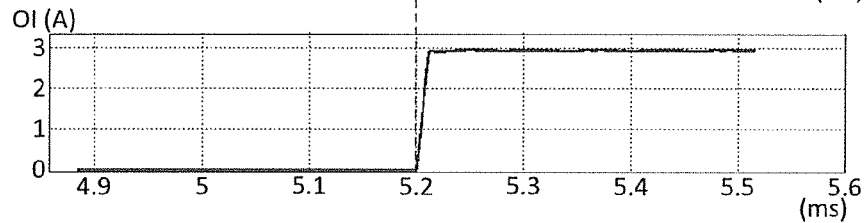

FIGS. 20A to 20C show variation curves of signals as a function of time, illustrating the behavior of the switched power stage PWS1 under a jump of the load current OI, the logic circuit LC performing the process of FIG. 13. In the operating case of FIGS. 20A to 20C, the values of the parameters p and q are defined by the look-up table LUT such that the pulses PLI generated in the current LI have a falling edge reaching 0 A or a negative value (as shown in FIG. 7A or 7B). FIG. 20A shows the variations of the output current OI drawn by the load LD. FIG. 20B shows the variations of the inductor current LI and the output current OI. FIG. 20C shows the variations of the output voltage OV. In FIG. 20C, the output current OI is first established at about 0 A. In FIG. 20A, the output voltage is regulated (between 1 and 1.05 V) at the reference voltage Vrf set to 1 V. For that time, the inductor current LI in FIG. 20B shows pulses PLI separated by pulses PB revealing that the operating mode PFM is activated. Then the output current OI jumps to about 3 A (FIG. 20C). At this time, the output voltage OV shows a small drop to about 0.985 V and then is regulated between 0.99 and 1.005 V. For that time, the inductor current LI in FIG. 20B shows that the operating mode PWM is activated with pulses PLI at step S4 and corrections performed at steps S5 and S7.

FIGS. 14C, 16C, 17C, 18C, 19C and 20C show that the output voltage OV is accurately regulated close to the reference voltage Vrf (with an error of less than 2%) without overshoot, even at startup and when the switched power stage PWS1 is subjected to large and sudden variations of the output current OI drawn by the load LD.

Figure 21:
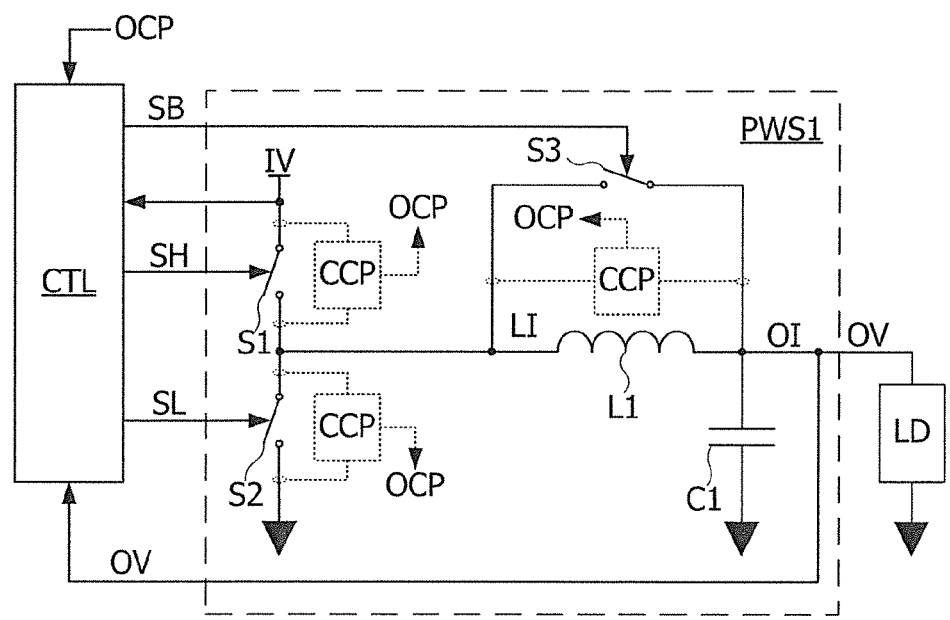
FIG. 21 is a circuit diagram of a switched power stage according to another embodiment.

FIG. 21 represents a switched power stage PWS2 according to another embodiment. The power stage PWS2 differs from the power stage PWS1 in that it comprises one or more current comparators CCP for detecting an overcurrent (greater than the maximum current value IMX) in a branch connected to one of the switches SW1, SW2, SW3. Each of the current comparator CCP activates the signal OCP when the current received is greater than the maximum current value IMX.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

In particular, other methods for controlling the switches SW1, SW2, SW3 may be derived from the methods disclosed to regulate the output voltage as a function of a reference voltage.

Further, steps S1 and S2 and the use of the signal OCP are not involved in the regulation of the output voltage OV itself, but is merely intended to protect the inductor L1 against overcurrent. Since such overcurrents do not necessarily occur, steps S1 and S2 or the use of the signal OCP may be omitted. In addition, such a protection could be performed using many other known means.

In some applications, the power stage may be used only in PFM or PWM mode. In PWM mode, a standby state (switch SW3 is not necessarily open between two pulses PLI.

Further, it may desirable in some applications to control the switched power stage with pulses PLI having a falling edge remaining positive as in FIG. 7C. To this purpose the content of the table LUT may be defined such that the numbers p and q satisfy the equation $p/(p+q)>OV/IV$.

Further, the present invention is not limited to a power stage with a single inductor. Thus inductor L1 may be formed by several inductors connected in series, and a respective switch may be connected in parallel to each inductor as switch SW3. The switches connected in parallel with the inductors may be controlled separately to adjust the inductance of the power stage. Moreover, each junction node between two inductors may be linked to ground by a capacitor.

Although the invention has been discussed with respect to various embodiments, it should be recognized that the invention comprises the novel and non-obvious claims supported by this disclosure.

What is claimed is:

1. A method of generating a regulated voltage, comprising:
   generating an output voltage from a high voltage source;
   providing an inductor having a first terminal and a second terminal linked to a low voltage source by a capacitor, the second inductor terminal supplying the output voltage to a load;
   generating command signals as a function of a high voltage supplied by the high voltage source and the output voltage, to reduce a difference between the output voltage and a reference voltage lower than the high voltage; and
   connecting the first inductor terminal exclusively either to the high input voltage or the low voltage or to the inductor second terminal, as a function of the command signals;
   wherein when the output voltage is lower than the reference voltage reduced by a tolerance voltage, the first inductor terminal is connected to the high voltage source for a clock period in accordance with the command signals, and wherein when the output voltage is greater than the reference voltage reduced by a tolerance voltage and lower than the reference voltage, the first inductor terminal is connected to the high voltage source for a first period, and connected to the low voltage source for a second period adjacent to the first period in accordance with the command signals;

wherein the first period is the clock period multiplied by a first positive integer number, and the second period is the clock period multiplied by a second positive integer number, the first and second integer numbers being defined such that the ratio of the first integer number to a sum of the first and second integer numbers is lower or equal to the ratio of the output voltage to the high voltage.

2. The method according to claim 1, further comprising connecting the first inductor terminal to the second inductor terminal for a clock period, when the output voltage is greater than the reference voltage.

3. The method according to claim 1, comprising connecting the first inductor terminal to the low voltage source for a clock period, when a current in the inductor is greater than a current threshold value.

4. A switched power stage providing a regulated output voltage, the power stage comprising:

an inductor having a first inductor terminal and a second inductor terminal forming an output of the power stage, a capacitor linking the second inductor terminal to the low voltage source, a switching device linking the first inductor terminal exclusively either to a high voltage source, or to a low voltage source, or to the second inductor terminal, and a control circuit for generating command signals controlling the switching device as a function of a high voltage supplied by the high voltage source and the output voltage, to reduce a difference between the output voltage and a reference voltage lower than the high voltage, with the control circuit configured to control the switching device to:

connect the first inductor terminal to the high voltage source for a clock period, when the output voltage is lower than the reference voltage reduced by a tolerance voltage, and generate a current pulse in the inductor by connecting the first inductor terminal to the high voltage source for a first period, and connecting the first inductor terminal to the low voltage source for a second period adjacent to the first period, when the output voltage is lower than the reference voltage and greater than the reference voltage reduced by the tolerance voltage.

5. The power stage according to claim 4, wherein the control circuit is configured to control the switching device to generate a current pulse in the inductor by successively connecting the first inductor terminal to the high voltage source for a first period and to the low voltage source for a second period adjacent to the first period, when the output voltage is lower than the reference voltage.

6. The power stage according to claim 5, wherein the current pulse generated in the inductor has a triangular shape.

7. The power stage according to claim 5, wherein the control circuit comprises a voltage generator for generating the reference voltage, and a comparator for comparing the output voltage with the reference voltage.

8. The power stage according to claim 5, wherein the first period is determined by multiplying a clock period by a first positive integer number, and the second period is determined by multiplying the clock period by a second positive integer number, the control circuit comprising a lookup table defining the first and second integer numbers as a function of a first ratio of the output voltage to the high voltage such that a second ratio of the first integer number to a sum of the first and second integer numbers is lower or equal to the first ratio.

9. The power stage according to claim 4, wherein the control circuit is configured to control the switching device to connect the first inductor terminal to the second inductor terminal for a clock period, when the output voltage is greater than the reference voltage.

10. The power stage according to claim 4, further comprising a voltage generator for generating the reference voltage and the reference voltage reduced by the tolerance voltage, a first voltage comparator for comparing the output voltage with the reference voltage, and a second voltage comparator for comparing the output voltage with the reference voltage reduced by the tolerance voltage.

11. The power stage according to claim 4, further comprising a current comparator for comparing a current in the inductor with a current threshold value, the control circuit being configured to control the switching device to connect the first inductor terminal to the low voltage source for a clock period, when the current in the inductor is greater than the current threshold value.

* * * * *

UNITED STATES PATENT AND TRADEMARK OFFICE
CERTIFICATE OF CORRECTION

| | | |
|---|---|---|
| PATENT NO. | : 9,496,787 B2 | Page 1 of 1 |
| APPLICATION NO. | : 14/593830 | |
| DATED | : November 15, 2016 | |
| INVENTOR(S) | : Hassan Ihs and Taner Dosluoglu | |

It is certified that error appears in the above-identified patent and that said Letters Patent is hereby corrected as shown below:

In the Specification

In Column 8, Line 46, delete "($\approx$6 Vrf/IV)." and insert --($\approx$ Vrf/IV).--, therefor.

In Column 11, Line 23, delete "1.1V)" and insert --1.01 V)--, therefor.

Signed and Sealed this
Thirteenth Day of February, 2018

Andrei Iancu
*Director of the United States Patent and Trademark Office*